(12) United States Patent
Verzijl et al.

(10) Patent No.: US 12,513,865 B2
(45) Date of Patent: Dec. 30, 2025

(54) HYBRID DATACENTRE MODULE (71) Applicant: Solo30 B.V., Schipluiden (NL)

(72) Inventors: Marco Hendricus Cornelis Verzijl, Schipluiden (NL); Willem Van Smaalen, Rotterdam (NL); Jorge Lakeman, Lelystad (NL); Maxim Amzarakov, Schipluiden (NL); Robbert Mees Lodder, Schipluiden (NL)

(73) Assignee: SOLO30 B.V., Schipluiden (NL)

( * ) Notice: Subject to any disclaimer, the term of this patent is extended or adjusted under 35 U.S.C. 154(b) by 227 days.

(21) Appl. No.: 18/274,861

(22) PCT Filed: Jan. 28, 2022

(86) PCT No.: PCT/EP2022/052101
§ 371 (c)(1),
(2) Date: Jul. 28, 2023

(87) PCT Pub. No.: WO2022/162174
PCT Pub. Date: Aug. 4, 2022

(65) Prior Publication Data
US 2024/0114667 A1    Apr. 4, 2024

(30) Foreign Application Priority Data
Jan. 29, 2021    (NL) ...................................... 2027460

(51) Int. Cl.
*H05K 7/20*    (2006.01)
(52) U.S. Cl.
CPC ..... *H05K 7/20781* (2013.01); *H05K 7/20236* (2013.01); *H05K 7/20272* (2013.01)

(58) Field of Classification Search
CPC .......... H05K 7/20781; H05K 7/20236; H05K 7/20272; H05K 7/20736; H05K 7/20218; H05K 7/20136
See application file for complete search history.

(56) References Cited

U.S. PATENT DOCUMENTS 6,927,980 B2 *    8/2005    Fukuda ................ G11B 33/142
8,797,740 B2 *    8/2014    Campbell .......... H05K 7/20836
                                                                361/699

(Continued)

FOREIGN PATENT DOCUMENTS

CN          109195413 A        1/2019
WO      WO 2018/097730 A1      5/2018

OTHER PUBLICATIONS

Dutch Search Report, issued in Priority Application No. 2027460, dated Nov. 11, 2021.

(Continued)

*Primary Examiner* — Jayprakash N Gandhi
*Assistant Examiner* — Matthew Sinclair Muir
(74) *Attorney, Agent, or Firm* — Birch, Stewart, Kolasch & Birch, LLP (57) ABSTRACT

A hybrid datacentre module includes a server housing, one or more server modules arranged in an interior of the server housing, and a cooling device, configured to dissipate heat generated by the server modules out of the server housing. The server housing includes one or more server racks and the one or more server modules include one or more air-cooled server modules arranged in the one or more server racks. The cooling device is connected to the server housing and configured to guide a flow of cooling fluid, and the cooling device is configured to pump the cooling fluid into, and to extract the cooling fluid from the server housing. The one or more server modules further include one or more immersion-cooled server modules. The datacentre module (Continued)

further includes a wired data transfer connection between the air-cooled server modules and immersion-cooled server modules. The cooling device is further connected to the immersion-cooled server modules, and the cooling device is further configured to pump the cooling fluid from the server housing into, and to extract the cooling fluid from the immersion-cooled server modules.

19 Claims, 2 Drawing Sheets

(56) References Cited

U.S. PATENT DOCUMENTS

| | | | | |
|---|---|---|---|---|
| 8,898,974 | B1* | 12/2014 | Gardner | E04C 2/52 |
| | | | | 52/220.8 |
| 10,064,313 | B2* | 8/2018 | Ishinabe | H05K 7/20781 |
| 10,455,722 | B1* | 10/2019 | Wildstone | H05K 7/1492 |
| 2011/0291981 | A1* | 12/2011 | Yang | G06F 3/04883 |
| | | | | 345/174 |
| 2015/0004880 | A1 | 1/2015 | Hagan | |
| 2015/0334880 | A1 | 11/2015 | Best | |
| 2018/0098464 | A1 | 4/2018 | Ishinabe | |
| 2020/0015383 | A1* | 1/2020 | Gao | H05K 7/20763 |
| 2021/0259129 | A1* | 8/2021 | Chen | H05K 7/183 |

OTHER PUBLICATIONS

International Search Report, issued in PCT/EP2022/052101, dated Jul. 4, 2022.
Written Opinion of the International Searching Authority, issued in PCT/EP2022/052101, dated Jul. 4, 2022.

* cited by examiner

HYBRID DATACENTRE MODULE

CROSS-REFERENCE TO RELATED APPLICATIONS

This application is the National Phase of PCT International Application No. PCT/EP2022/052101, filed on Jan. 28, 2022, which claims the benefit under 35 U.S.C. § 119(a) to Patent Application No. 2027460, filed in the Netherlands on Jan. 29, 2021, all of which are hereby expressly incorporated by reference in their entirety into the present application.

BACKGROUND

Field of the Invention

The present invention relates to a hybrid datacentre module, comprising a server housing and air-cooled and immersion-cooled modules arranged therein. The present invention further provides a method of retrofitting an existing datacentre having air-cooled server modules with immersion-cooled server modules, the use of a hybrid datacentre module and a method of cooling a hybrid datacentre module.

Discussion of the Related Art

At present, various types of datacentre modules are known. Some of these modules are mobile can be installed as a single unit to form a complete datacentre or can be installed plug-and-play in an existing datacentre to improve the computing power of the existing datacentre.

An example of such a datacentre module is disclosed in WO 2018/097730 A1. The known datacentre module comprises a housing in which a plurality of server racks is located, containing air-cooled server modules, and which comprises a cooling device to provide cooling air to the server modules in the server housing. However, these air-cooled servers are limited in computing power, whereas other server types, for example immersion-cooled servers, are known to provide improved computing speeds. At present, it is not known to provide a datacentre module with immersion-cooled servers, or at least not of a modular type as in the prior art. Even if such a datacentre module were to be provided with immersion-cooled servers, their performance would become limited since they rely on air-cooled server modules for storage of data. The distance between the immersion-cooled computing server modules and the air-cooled storage server modules would become large, which limits the data transfers between the different server modules and which thus limits the performance of the immersion-cooled server modules.

A further drawback of the known datacentre module is that residual heat obtained by the air-cooling of the server modules cannot be re-used efficiently, for example for domestic heating, because the temperature thereof is too low to be useful in external heating networks. These datacentre modules are therefore unable to keep up with the trend to become more environmentally-friendly.

In United States patent application US 2015/004880 A1, various embodiments of datacentre modules are disclosed, some of which comprise server modules that are partly submerged in oil and partly exposed to an air flow above the oil.

In Chinese patent application CN 109195413 A, a datacentre module is disclosed, which comprises a air-cooled server module and an immersion-cooled server module. Each of these server modules is cooled by means of a respective cooling device.

Object of the Invention

It is therefore an object of the invention to provide a datacentre module with improved computing performance that is more environmentally-friendly than the know datacentre modules, or at least an object to provide an alternative datacentre module.

DETAILED DESCRIPTION

According to a first aspect, the present invention provides a hybrid datacentre module, comprising:
a server housing,
one or more server modules arranged in an interior of the server housing, and
a cooling device, configured to dissipate heat generated by the server modules out of the server housing.

The server housing comprises one or more server racks and the one or more server modules comprise one or more air-cooled server modules arranged in the one or more server racks. The cooling device is connected to the server housing and configured to guide a flow of cooling fluid, and is configured to pump the cooling fluid into the server housing at a first inlet temperature and configured to extract the cooling fluid from the server housing at a first outlet temperature, higher than the first inlet temperature.

In the hybrid datacentre module according to the present invention, the one or more server modules further comprise one or more immersion-cooled server modules, which are also arranged in the interior of the server housing, and the datacentre module further comprises a wired data transfer connection between the air-cooled server modules and immersion-cooled server modules. The cooling device is further connected to the immersion-cooled server modules, and is further configured to pump the cooling fluid from the server housing into the immersion-cooled server modules at a second inlet temperature and configured to extract the cooling fluid from the immersion-cooled server modules at a second outlet temperature, higher than the second inlet temperature.

The inventive datacentre module is a hybrid datacentre module, which implies that it operates more than a single type of server modules. In addition to the known air-cooled server modules in the datacentre module, the hybrid datacentre module according to the present invention additionally comprises immersion-cooled server modules, which are arranged inside the interior of the same server housing. Both types of server modules are thus integrated in a single datacentre module and are wiredly connected to each other to enable data communication between both types.

In the present hybrid datacentre module, the immersion-cooled server modules may be used for computing purposes and the air-cooled server modules may be used for data storage purposes, wherein the air-cooled server module may comprise Open Computing Program (OCP) server modules.

Since both types of server modules are integrated in the same server housing, the length of the wired data transfer connection may be relatively small, for example less than 10 meters, preferably less than 5 meters. As such, very few losses in data transfer occur between the immersion-cooled server modules and the air-cooled server modules, which enables the immersion-cooled server modules to operate at their maximum performances.

As a further result of the relatively short wired data transfer connection, low latency occurs in interaction between both types of server modules allowing for maximized unified performance. Without such low latency certain high power demanding software running on the immersion-cooled server modules would not be able to totally benefit the full potential of executing power of those immersion-cooled server modules. As such, the invention allows both types of server modules being in standard installments/embodiments—in common off-the-shelves immersed cooling encasements or air cooled racks respectively, not requiring dedicated and complex assemblies of the two—and still achieving highest possible performance, individually as well as in combination. This would not be able to achieve with the higher latency of longer data transfer connections between immersed and air cooled equipment in regular DC installments, which are not installed in a common server housing with dedicated combined cooling.

According to the present invention, the cooling device is connected to both the air-cooled server modules and to the immersion-cooled server modules and is configured to provide cooling capacity for both of them. The cooling device is configured to first cool the air-cooled server modules, which requires a relatively low temperature, e.g. the first inlet temperature, of the cooling fluid entering the server housing. The cooling fluid that is extracted from the server housing, after cooling the air-cooled server modules, has a higher temperature, e.g. the first outlet temperature, as a result the heat absorbed from the air-cooled server modules.

In embodiments, the first inlet temperature may be in the range between 20° and 25° C., for example 22° C., and the first outlet temperature may be in the range between 30° and 35° C., for example 32° C.

The cooling fluid may comprise a gaseous coolant, for example air, that is circulated through the interior of the server housing to directly cool the air-cooled server modules. Alternatively, the cooling fluid may comprise a liquid coolant, for example water, that is circulated through a closed ducting system, configured to indirectly cool the air-cooled server modules by cooling the surrounding air in the interior of the server housing via a heat exchanger in the server housing.

After exiting the server housing for cooling the air-cooled server modules, the cooling fluid is, according to the present invention, passed on towards the immersion-cooled server modules. Here, the cooling fluid is fed into the immersion-cooled server modules at a second inlet temperature that may be similar to the first exit temperature. Although this second inlet temperature is higher than the first inlet temperature used for cooling the air-cooled server modules, it is still low enough to provide for cooling power of the immersion-cooled server modules, which typically operate at higher temperatures than the air-cooled server modules. After having cooled the immersion-cooled server modules, the cooling fluid has an even higher temperature, e.g. the second outlet temperature, as a result the heat absorbed from the immersion-cooled server modules.

In embodiments, the second inlet temperature may be in the range between 30° and 35° C., for example 32° C., and the second outlet temperature may be in the range between 40° and 45° C., for example 42° C.

In the case where the cooling fluid comprises a gaseous coolant, the cooling fluid may pass towards a heat exchanger to withdraw heat from the liquid, for example oil, in which the immersion-cooled server modules are submerged. Where the cooling fluid comprises a liquid coolant, the liquid cooling fluid may be passed directly through the immersion-cooled server modules, i.e. so that the server modules effectively become submerged in the liquid cooling fluid. Alternatively, the liquid cooling fluid may be circulated through a closed ducting system, configured to indirectly cool the immersion-cooled server modules by cooling the immersion liquid, e.g. electrically non-conductive oil, in the interior of the server module via a heat exchanger.

The second outlet temperature of the cooling fluid exiting the immersion-cooled server modules may be much higher than the first outlet temperature of the cooling fluid from the air-cooled server modules. This higher temperature results in a higher thermal energy of the cooling fluid and enables more efficient re-usage of the heat that is withdrawn from the server modules. This may result in a more energy-efficient, and thus more environmentally-friendly, datacentre module than existing datacentre modules, where residual heat is simply discarded towards the environment.

The cooling device comprises a first cooling circuit, which is connected to the server housing and configured to guide a flow of first cooling fluid. The cooling device is thereby configured to pump the first cooling fluid into the server housing at the first inlet temperature and configured to extract the first cooling fluid from the server housing at the first outlet temperature.

According to this embodiment, the cooling device further comprises a second cooling circuit, which is connected to the immersion-cooled server modules and configured to guide a flow of second cooling fluid. The cooling device is further configured to pump the second cooling fluid into the immersion-cooled server modules at the second inlet temperature and configured to extract the second cooling fluid from the immersion-cooled server modules at the second outlet temperature.

The cooling device also comprises a first heat exchanger, which is fluidly connected to the first cooling circuit and the second cooling circuit. The first heat exchanger is configured to transfer heat from the first cooling fluid in the first cooling circuit, that is to be extracted from the server housing, to the second cooling fluid in the second cooling circuit, that is to be pumped into the immersion-cooled server modules.

In this way, each of the types of server modules comprises its own respective cooling circuit. The first cooling circuit may project into the server housing and the first cooling fluid may be a gaseous coolant, for example air, which may freely pass through the server housing and along the air-cooled server modules.

The second cooling fluid may be different from the first cooling fluid, for example being a liquid, such as water, which may circulate through the immersion-cooled server modules. The liquid cooling fluid may be passed directly through the immersion-cooled server modules, i.e. so that the server modules effectively become submerged in the liquid cooling fluid.

Alternatively, the liquid cooling fluid may be circulated through a closed ducting system, configured to indirectly cool the immersion-cooled server modules by cooling the immersion liquid in the interior of the server module via a heat exchanger. Here, the server modules may be submerged in an oil that is electrically non-conductive, wherein the oil is configured to exchange heat towards the liquid cooling fluid via a heat exchanger.

In between the first cooling circuit and the second cooling circuit, the first heat exchanger is provided to transfer heat from the first cooling fluid, e.g. obtained from the air-cooled server modules, to the second cooling fluid, e.g. to be fed towards the immersion-cooled server modules. Accordingly, the first cooling fluid is cooled and can be fed towards the interior of the server housing again, to cool the air-cooled server modules again.

According to invention, all components, i.e. server modules and cooling equipment, may form a single integrated concept, being integrated in a single datacentre module. As a result all heat produced by those systems is captured into cooling fluids, being air or liquid, and available for re-use. No energy may need to be lost by any system outside the present datacentre module according to the invention.

In particular, batteries and Uninterrupted Power Supplies (UPS's) are integrated in a single housing, all benefiting from the cooling by the cooling device that is used to cool the server modules and not requiring their own dedicated, external cooling.

The present invention may provide the benefit that residual heat from the datacentre module can be used efficiently, since the obtained residual heat from the second cooling circuit, i.e. at the second outlet temperature may have sufficient capacity. In particular when the second cooling fluid is a cooling liquid, the second cooling fluid may have sufficient capacity to be for example used for domestic heating.

In an embodiment of the hybrid datacentre module, the server housing comprises a first compartment and a second compartment, which are separated from each other. The one or more server racks, with the one or more air-cooled server modules arranged therein, are thereby arranged in the first compartment and the one or more immersion-cooled server modules are arranged in the second compartment. The cooling device is configured to pump the cooling fluid first into the first compartment and then into the immersion-cooled server modules in the second compartment.

With the server housing comprising two compartments that are separated from each other, the conditions may be different in each of the compartments. The cooling device first pumps the cooling fluid into the first compartment, where the air-cooled server modules are located. The cooling device is configured to cool the air inside the first compartment, for example by inserting gaseous cooling fluids, e.g. air, in the first compartment directly, or by passing a liquid cooling fluid along a heat exchanger in the first compartment to cool the air in the first compartment.

The immersion cooled server modules are located in the second compartment and may be subjected to a different climate. No air cooling may be needed to cool the second compartment itself, so the cooling fluid may be passed directly through the immersion-cooled server modules.

In an embodiment, the hybrid datacentre module may comprise two first compartments, for example on opposite sides of the second compartment. In embodiments, the at least part of the air-cooled servers may be arranged in the same compartment.

In a further embodiment of the hybrid datacentre module that comprises the first cooling circuit and the second cooling circuit, wherein the first cooling circuit is connected to the interior of the first compartment and wherein the second cooling circuit is connected to the immersion-cooled server modules in the second compartment.

According to this embodiment, the first cooling fluid, for example a gaseous first cooling fluid, such as air, is fed only to the interior of the first compartment to cool the air-cooled server modules arranged therein. The separate second cooling circuit is configured to direct the second cooling fluid, for example a liquid second cooling fluid, such as water, to the second compartment to cool the immersion-cooled server modules arranged therein. As such, each of the compartments may be connected to the cooling device by means of its own cooling circuit with its own cooling fluid, e.g. a dedicated cooling fluid that is not fed towards the respective other compartment.

In an alternative embodiment, however, the datacentre module comprises a first compartment and a second compartment that each comprise one or more air-cooled server modules and/or one or more immersion-cooled server modules. Such a datacentre module may comprise a first compartment with air-cooled server modules and immersion-cooled server modules and a second compartment with air-cooled server modules and immersion-cooled server modules, or may comprise a first compartment with air-cooled server modules and a second compartment with air-cooled server modules and immersion-cooled server modules, or may comprise a first compartment with immersion-cooled server modules and a second compartment with air-cooled server modules and immersion-cooled server modules, or vice versa.

Hence, the configuration of the cooling device does not necessarily require that only one type of server module, e.g. either air-cooled or immersion-cooled, is present in a single compartment, but also allows multiple types of server modules, e.g. both air-cooled and immersion-cooled, to be present in a single compartment.

In an embodiment, the hybrid datacentre module further comprises a heating fluid inlet and a heating fluid outlet, which are fluidly connected to the cooling device and fluidly connectable to an external heating network, to respectively allow entry of a heating fluid from the heating network into the cooling device and exit of the heating fluid from the cooling device into the heating network.

Via the heating fluid inlet, a heating fluid from an external heating network, for example cold water from a district heating network, may enter the hybrid datacentre module and may be fed into the cooling device. By means of the cooling device, the heat obtained from the server modules may be transferred into the heating fluid. Accordingly, the server modules are cooled and the heating fluid, e.g. the water from the district heating network, may be heated. With the heat obtained from both types of server modules, the temperature of the heating fluid may be increased to a higher temperature than in the existing datacentre modules, where the air-cooled server modules are not able to heat the heating fluid to the same high temperature. As such, the thermal energy transferred into the heating fluid may be larger in the present hybrid datacentre module. After being heated, the heating fluid may be transported out of the hybrid datacentre module via the heating fluid outlet, in order to be fed back towards the external heating network.

In a further embodiment, the hybrid datacentre module further comprises a heating fluid circuit and a third heat exchanger. The heating fluid circuit is fluidly connected to the heating fluid inlet and to the heating fluid outlet to allow a flow of the heating fluid therethrough between the heating fluid inlet and the heating fluid outlet. The third heat exchanger is fluidly connected to the cooling device and the heating fluid circuit and configured to transfer heat from the cooling device, which heat has been extracted from the server housing, to the heating fluid that is to be passed through the heating fluid circuit.

According to this embodiment, the heating fluid from the external heating network, e.g. the cold water from the district heating network, is guided into the heating fluid circuit of the hybrid datacentre module. The heating fluid is guided towards the third heat exchanger, where the heat obtained from the server modules is transferred indirectly towards the heating fluid. Accordingly, the heating fluid does not need to be in contact with the server modules. Instead, the cooling fluid circuit of the hybrid datacentre module may be a closed-off system, in order to reduce possible risks of failure. After being heated, the heating fluid may leave the third heat exchanger and may flow out of the hybrid datacentre module via the heating fluid outlet, back into the external heating network.

In an alternative embodiment of the hybrid datacentre module, the cooling device is fluidly connected to the heating fluid inlet and to the heating fluid outlet to allow a flow of the heating fluid through the cooling device.

This embodiment of the hybrid datacentre module may lack the heating fluid circuit and a third heat exchanger, so that the heating fluid, e.g. the water from the district heating network, may flow directly into the cooling device. In the cooling device, the heating fluid may be fed towards the server modules, in particular towards the immersion-cooled server modules, in order to be directly heated by the server modules, instead of indirectly via a separate heat exchanger. Accordingly, this hybrid datacentre module may be provided relatively inexpensive, e.g. having fewer components.

In an embodiment, the hybrid datacentre module is connectable to an external heat source in the external heating network and configured to improve the quality, i.e. the temperature and/or flow rate, of heat obtained from the external heat source in the external heating network. Upon connection, the external heat source may be either directly or indirectly, coupled to and located upstream from the air-cooled server modules and the immersion-cooled server modules, so that heat from the external heat source is first upgraded using heat from the air-cooled server modules and secondly upgraded using heat from the immersion-cooled server modules.

This upgrading of heat may concern the increase of the temperature of the heating fluid out of the external heat source. Furthermore, the external heat source may for example be a classic air-cooled datacentre, from which heated air is taken as a heating fluid, therefore requiring the heat exchanger to convert this into heat fed towards the air-cooled server modules and/or the immersion-cooled server modules in the present hybrid datacentre module.

In an embodiment, the hybrid datacentre module comprises a control unit that is configured to control the cooling device. The control unit may be configured to control a flow rate of the first cooling fluid in the first cooling circuit and/or of the second cooling fluid in the second cooling circuit. By increasing the flow rate in the cooling circuits, the amount of heat withdrawn from the respective server modules may be increased and/or the respective outlet temperature of that cooling circuit may be lowered. Similarly, the flow rate may be decreased to decrease the amount of heat withdrawn and/or to raise the outlet temperatures.

Alternatively or additionally, the control unit may be configured to control a temperature and/or a flow rate of heating fluid departing from the cooling device towards the external heating network. By increasing the flow rate of the heating fluid, the amount of transferred heat from the hybrid datacentre module towards the external heating network may be increased, but may also result in a lowering of the temperature of the heating fluid departing from the datacentre module.

By controlling the cooling device in a manner described above, the heat obtained from the server modules may be controlled to obtain a constant output temperature towards the external heating network, irrespective of the amount of heat generated by the server modules and thus irrespective of the computing carried out by the server modules. The controlling of the cooling device may therefore enable efficient re-use of the residual heat from the server modules.

In an embodiment, the hybrid datacentre module comprises a power inlet, which is electrically connectable to an external electrical power supply for supplying electrical power to the datacentre module.

All electric components, such as the server modules and pumps of the cooling device, may be connected to the power inlet, so that only a single connection between the hybrid datacentre module and the external electrical power supply, e.g. via the power inlet, needs to be made to provide electrical power to the entire hybrid datacentre module in a plug-and-play manner.

Additionally, the hybrid datacentre module may also comprise an emergency battery and/or emergency generator, which are configured to provide electrical power to the datacentre module in case of problems with the regular supply of electrical power from the external electrical power supply, e.g. of the electricity grid. Accordingly, this hybrid datacentre module may comprise an uninterruptable power supply (UPS), to ensure a constant supply of electrical power to the server modules, even when the datacentre module were to be subjected to an undesired power outage.

In an embodiment, the hybrid datacentre module comprises a data interface, which is wiredly connected for data transfer to the server modules and wiredly connectable to an external network, e.g. to server modules of an existing datacentre, for data transfer between the server modules and the external network.

Similar to the power inlet, the data interface may provide for a single data connection between all components, e.g. all server modules and the external network, to improve the convenience of the hybrid datacentre module.

In an embodiment, the hybrid datacentre module comprises a first side wall and a second side wall, which extend parallel to each other and between which the first compartment and the second compartment are defined. The first compartment thereby comprises a first row of server racks adjacent the first side wall, a second row of server racks adjacent the second side wall, and an aisle in between the first row of server racks and the second row of server racks.

The first side wall and the second side wall oppose each other and define at least the first compartment in between them. The server racks are arranged adjacent the respective side walls so that they are spaced apart, to define the aisle. The aisle may be accessible for humans, for example to gain access to operators to install or remove server modules, or for carrying out repairs and/or maintenance. The aisle may thereto have a width in the range between 1.30 m and 1.80 m to ensure accessibility of all relevant components, e.g. of all server modules.

According to this embodiment, an upstream part the cooling device, e.g. upstream of the first compartment, projects in the aisle of the first compartment, being configured to pump the cooling fluid into the first compartment in the aisle. In this way, the cold cooling fluid, e.g. at the first inlet temperature, enters the aisle at a relatively low temperature. Accordingly, the temperature in the aisle may not be too large to prohibit humans from working in the first compartment.

The cooling device may have several cooling fluid outlets in the aisle, for example being arranged in a ceiling of the first compartment and being spaced from each other in a longitudinal direction parallel to the first side wall and second side wall.

In a further embodiment, the hybrid datacentre module comprises a first spacing between the first side wall and the first row of server racks and a second spacing between the second side wall and the second row of server racks.

The fronts of the server racks and the air-cooled server modules, facing the aisle, may be flush with each other to offer a smooth appearance and to make it easier for operators to install or remove server modules, or for carrying out repairs and/or maintenance. Since various types of server modules may have different depths, the spacings at the side walls, e.g. at the rear ends of the server modules and of the server racks, may be variable over the length of the rows of server modules, e.g. in a direction parallel to the longitudinal direction.

According to this embodiment, a downstream part of the cooling device, e.g. downstream of the first compartment, projects into the first spacing and into the second spacing, such that the cooling device is configured to extract the cooling fluid out of the first compartment from the first spacing and the second spacing, to effect a flow of cooling fluid from the aisle through the first row of server racks and through the second row of server racks.

In this way, the cooling fluid may be heated by the air-cooled server modules when it passes alongside the server modules and through the server racks in direction from the aisle towards the respective side walls of the hybrid datacentre module. After having arrived at the spacings between the respective server racks and the side walls, the cooling fluid is extracted out of the first compartment, e.g. being extracted at the first outlet temperature. The rear sides of the server modules are thereby typically subjected to higher temperatures than in the aisle, but, in principle, the rear sides of the server modules do not need to be accessed by operators, so the temperatures may lie at a higher level there.

In an embodiment, the hybrid datacentre module further comprises an entry compartment, which is located in between the first compartment and the second compartment, optionally being separated therefrom by partition walls. The entry compartment comprises an entry door providing access into the entry compartment from outside the datacentre module, and the partition walls may comprise access doors to allow access from the entry compartment into the first compartment and into the second compartment. Alternatively, however, the partition walls may comprise an open doorway to provide access from the entry compartment to the first compartment or the second compartment, or the entry compartment may even lack partition walls.

The entry compartment may be accessible for operators to monitor and control the functioning of the hybrid datacentre module. The entry compartment may for example comprise a user interface to read out and set parameters for the hybrid datacentre module.

In an embodiment, the hybrid datacentre module further comprises a separate cooling compartment, which is located adjacent the server housing, wherein the cooling device is at least partly arranged in the cooling compartment. Various components of the cooling device, such as pumps, fluid storages and heat exchangers may be provided in the cooling compartment, in order not to limit any space available for the server modules in the interior of the server housing.

In a further embodiment, the hybrid datacentre module may comprise two cooling compartments, which may be located on opposite ends of the hybrid datacentre module, so that the first compartment, the second compartment and/or the entry compartment may be located in between both cooling compartments.

In an embodiment, the hybrid datacentre module may comprise dimensions that correspond to the dimensions of an intermodal container, for example a 40-foot long intermodal container, e.g. with a length of 12.2 meters, a width of 2.4 meters and a height between 2.6 and 2.9 meters.

Alternatively, however, the hybrid datacentre module may comprises dimensions larger than those of intermodal containers, for example having a larger width. The benefit of such larger dimensions is that a larger number of server modules and/or server modules of a larger size may be placed in the datacentre module.

According to a second aspect, the present invention provides a hybrid datacentre module, comprising:
a server housing,
one or more server modules arranged in an interior of the server housing, and
a cooling device, configured to dissipate heat generated by the server modules out of the server housing.

The server housing comprises one or more server racks and the one or more server modules comprise one or more air-cooled server modules arranged in the one or more server racks. The cooling device is connected to the server housing and configured to guide a flow of cooling fluid, and is configured to pump the cooling fluid into the server housing at a first inlet temperature and configured to extract the cooling fluid from the server housing at a first outlet temperature, higher than the first inlet temperature.

In the hybrid datacentre module according to the present invention, the one or more server modules further comprise one or more immersion-cooled server modules, which are also arranged in the interior of the server housing, and the datacentre module further comprises a wired data transfer connection between the air-cooled server modules and immersion-cooled server modules. The cooling device is further connected to the immersion-cooled server modules, and is further configured to pump the cooling fluid from the server housing into the immersion-cooled server modules at a second inlet temperature and configured to extract the cooling fluid from the immersion-cooled server modules at a second outlet temperature, higher than the second inlet temperature.

The inventive datacentre module is a hybrid datacentre module, which implies that it operates more than a single type of server modules. In addition to the known air-cooled server modules in the datacentre module, the hybrid datacentre module according to the present invention additionally comprises immersion-cooled server modules, which are arranged inside the interior of the same server housing. Both types of server modules are thus integrated in a single datacentre module and are wiredly connected to each other to enable data communication between both types.

In the present hybrid datacentre module, the immersion-cooled server modules may be used for computing purposes and the air-cooled server modules may be used for data storage purposes, wherein the air-cooled server module may comprise Open Computing Program (OCP) server modules.

Since both types of server modules are integrated in the same server housing, the length of the wired data transfer connection may be relatively small, for example less than 10 meters, preferably less than 5 meters. As such, very few losses in data transfer occur between the immersion-cooled server modules and the air-cooled server modules, which enables the immersion-cooled server modules to operate at their maximum performances.

As a further result of the relatively short wired data transfer connection, low latency occurs in interaction between both types of server modules allowing for maximized unified performance. Without such low latency certain high power demanding software running on the immersion-cooled server modules would not be able to totally benefit the full potential of executing power of those immersion-cooled server modules. As such, the invention allows both types of server modules being in standard installments/embodiments—in common off-the-shelves immersed cooling encasements or air cooled racks respectively, not requiring dedicated and complex assemblies of the two—and still achieving highest possible performance, individually as well as in combination. This would not be able to achieve with the higher latency of longer data transfer connections between immersed and air cooled equipment in regular DC installments, which are not installed in a common server housing with dedicated combined cooling.

According to the present aspect of the invention, the cooling device is connected to both the air-cooled server modules and to the immersion-cooled server modules and is configured to provide cooling capacity for both of them. The cooling device is configured to first cool the air-cooled server modules, which requires a relatively low temperature, e.g. the first inlet temperature, of the cooling fluid entering the server housing. The cooling fluid that is extracted from the server housing, after cooling the air-cooled server modules, has a higher temperature, e.g. the first outlet temperature, as a result the heat absorbed from the air-cooled server modules.

In embodiments, the first inlet temperature may be in the range between 20° and 25° C., for example 22° C., and the first outlet temperature may be in the range between 30° and 35° C., for example 32° C.

The cooling fluid may comprise a gaseous coolant, for example air, that is circulated through the interior of the server housing to directly cool the air-cooled server modules. Alternatively, the cooling fluid may comprise a liquid coolant, for example water, that is circulated through a closed ducting system, configured to indirectly cool the air-cooled server modules by cooling the surrounding air in the interior of the server housing via a heat exchanger in the server housing.

After exiting the server housing for cooling the air-cooled server modules, the cooling fluid is, according to the present invention, passed on towards the immersion-cooled server modules. Here, the cooling fluid is fed into the immersion-cooled server modules at a second inlet temperature that may be similar to the first exit temperature. Although this second inlet temperature is higher than the first inlet temperature used for cooling the air-cooled server modules, it is still low enough to provide for cooling power of the immersion-cooled server modules, which typically operate at higher temperatures than the air-cooled server modules. After having cooled the immersion-cooled server modules, the cooling fluid has an even higher temperature, e.g. the second outlet temperature, as a result the heat absorbed from the immersion-cooled server modules.

In embodiments, the second inlet temperature may be in the range between 30° and 35° C., for example 32° C., and the second outlet temperature may be in the range between 40° and 45° C., for example 42° C.

In the case where the cooling fluid comprises a gaseous coolant, the cooling fluid may pass towards a heat exchanger to withdraw heat from the liquid, for example oil, in which the immersion-cooled server modules are submerged. Where the cooling fluid comprises a liquid coolant, the liquid cooling fluid may be passed directly through the immersion-cooled server modules, i.e. so that the server modules effectively become submerged in the liquid cooling fluid. Alternatively, the liquid cooling fluid may be circulated through a closed ducting system, configured to indirectly cool the immersion-cooled server modules by cooling the immersion liquid, e.g. electrically non-conductive oil, in the interior of the server module via a heat exchanger.

The second outlet temperature of the cooling fluid exiting the immersion-cooled server modules may be much higher than the first outlet temperature of the cooling fluid from the air-cooled server modules. This higher temperature results in a higher thermal energy of the cooling fluid and enables more efficient re-usage of the heat that is withdrawn from the server modules. This may result in a more energy-efficient, and thus more environmentally-friendly, datacentre module than existing datacentre modules, where residual heat is simply discarded towards the environment.

The hybrid datacentre module according to the second aspect further comprises a second heat exchanger, e.g. a radiator, that is located in the server housing, comprising a fluid passage that is fluidly connected to the cooling device and a heat exchanger surface that is integrally connected to the fluid passage. The second heat exchanger is configured to withdraw heat from the air in the server housing upon contact with the heat exchanger surface.

The surrounding air inside the server housing may be heated by the air-cooled server modules, for example being circulated alongside the air-cooled server modules to absorb heat from the server modules by convection. The air is further circulated along the heat exchanger surface of the second heat exchanger, for example a corrugated heat exchanger surface to increase the surface area thereof, that is in contact with the cooling fluid.

The cooling device is configured to pump the cooling fluid, e.g. a liquid coolant, for example water, into the fluid passage to pass through the heat exchanger. The cooling fluid entering the second heat exchanger at the first inlet temperature may have a lower temperature than the temperature of the surrounding air in the server housing, so that heat can be transferred from the air, via the heat exchanger surface, towards the cooling fluid. Accordingly, the cooling fluid is heated by the air and exits the heat exchanger, e.g. also exiting the server housing, at the first outlet temperature, which is higher than the first inlet temperature.

The hybrid datacentre module according to the second aspect of the invention may comprise one or more of the features and/or may provide one or more of the benefits disclosed herein in relation to the hybrid datacentre module according to the first aspect of the invention, in particular comprising one or more of the features recited in the claims.

The present invention may provide the benefit that residual heat from the datacentre module can be used efficiently, since the obtained residual heat from the second cooling circuit, i.e. at the second outlet temperature may have sufficient capacity. In particular when the second cooling fluid is a cooling liquid, the second cooling fluid may have sufficient capacity to be for example used for domestic heating.

The present invention also provides a method of retrofitting an existing datacentre having air-cooled server modules with immersion-cooled server modules, comprising the steps of:

providing a hybrid datacentre module as described herein,
arranging the hybrid datacentre module inside the existing datacentre, and
wiredly connecting the one or more server modules of the hybrid datacentre module to the air-cooled server modules of the existing datacentre.

In the present method, the inventive hybrid datacentre module provides a flexible and convenient way of increasing the computing power of an existing datacentre by means of immersion-cooled server modules. In case these immersion-cooled server modules had to be placed in an existing datacentre directly, a completely new infrastructure would be required to be installed. Hence, the immersion-cooled server modules rely on liquid cooling, whereas the existing server modules in the datacentre are typically air-cooled in a way that cooled air is provided in the entire building.

The hybrid datacentre module that is provided in the method according to the present invention comprises air-cooled server modules and immersion-cooled server modules, which are arranged inside the interior of the same server housing. Both types of server modules are integrated in a single module and are wiredly connected to each other to enable data communication between both types. Since both types of server modules are integrated in the same server housing, the length of the wired data transfer connection may be relatively small, for example less than 10 meters, preferably less than 5 meters. As such, very few losses in data transfer occur between the immersion-cooled server modules and the air-cooled server modules, which enables the immersion-cooled server modules to operate at their maximum performances.

The hybrid datacentre module comprises its own cooling device, which is connected to both the air-cooled server modules and to the immersion-cooled server modules and configured to provide cooling capacity for both of them. It is therefore not necessary to separately install a dedicated cooling system for the immersion-cooled server modules, since they comprise their own cooling device in the hybrid datacentre module.

The hybrid datacentre module is, according to the present method, arranged in the existing datacentre, for example in the same room where the existing server modules are present, but the hybrid datacentre module may be alternatively installed in a different room of the datacentre, or even outdoors, since the hybrid datacentre module itself does not require a specifically controlled climate.

The wired connection between the hybrid datacentre module and the existing datacentre, e.g. the air-cooled server modules thereof, may comprise an electric connection to an external electrical power supply via a power inlet of the hybrid datacentre module for supplying electrical power to the hybrid datacentre module and/or may comprise a wired connection via a data interface of the hybrid datacentre module for data transfer between the server modules in the hybrid datacentre module and an external network, e.g. to the server modules of the existing datacentre. The hybrid datacentre module can therefore be installed conveniently in a plug-and-play-manner in an existing datacentre to improve the computing power of the existing datacentre, e.g. to provide the datacentre with additional computing power from immersion-cooled server modules.

The present invention also provides the use of a hybrid datacentre module as described herein for computing and/or storing data.

The hybrid datacentre module used comprises both air-cooled server modules and immersion-cooled server modules, which are arranged inside the interior of the same server housing. Both types of server modules are thus integrated in a single module and are wiredly connected to each other to enable data communication between both types. The immersion-cooled server modules may be used for computing purposes and the air-cooled server modules may be used for data storage purposes. Since both types of server modules are integrated in the same server housing, the length of a wired data transfer connection may be relatively small, for example less than 10 meters, preferably less than 5 meters. As such, very few losses in data transfer occur between the immersion-cooled server modules and the air-cooled server modules, which enables the immersion-cooled server modules to operate at their maximum performances.

The present invention finally also provides a method of cooling a hybrid datacentre module, for example a hybrid datacentre module as described herein, comprising the steps of:
pumping a cooling fluid, e.g. a first cooling fluid in a first cooling circuit, into a server housing, which comprises one or more server racks having one or more air-cooled server modules arranged therein, at a first inlet temperature, and
extracting the cooling fluid, e.g. the first cooling fluid, from the server housing at a first outlet temperature, higher than the first inlet temperature,
wherein the one or more server modules further comprise one or more immersion-cooled server modules and wherein the method further comprises the steps of:
optionally, transferring heat from the first cooling fluid in the first cooling circuit to the second cooling fluid in the second cooling circuit by means of a first heat exchanger,
pumping the cooling fluid from the server housing, e.g. a second cooling fluid in a second cooling circuit, into one or more immersion-cooled server modules at a second inlet temperature, and
extracting the cooling fluid, e.g. the second cooling fluid, from the immersion-cooled server modules at a second outlet temperature, higher than the second inlet temperature.

In the cooling method according to the invention, a hybrid datacentre module is cooled, which comprises multiple different type of server modules. The hybrid datacentre module comprises air-cooled server modules and immersion-cooled server modules, which may be arranged inside the interior of the same server housing.

The cooling may be carried out by means of a cooling device that is connected to both the air-cooled server modules and to the immersion-cooled server modules and configured to provide cooling capacity for both of them. The cooling device is configured to first cool the air-cooled server modules, which requires a relatively low temperature, e.g. the first inlet temperature, of the cooling fluid, e.g. the first cooling fluid, entering the server housing. The cooling fluid that is extracted from the server housing, after cooling the air-cooled server modules, has a higher temperature, e.g. the first outlet temperature, as a result the heat absorbed from the air-cooled server modules.

In embodiments of the method, the first inlet temperature may be in the range between 20° and 25° C., for example 22° C., and the first outlet temperature may be in the range between 30° and 35° C., for example 32° C.

The cooling fluid, e.g. the first cooling fluid, may comprise a gaseous coolant, for example air, that is circulated through the interior of the server housing to directly cool the air-cooled server modules. Alternatively or additionally, the cooling fluid, e.g. the second cooling fluid, may comprise a liquid coolant, for example water, that is circulated through a closed ducting system, configured to indirectly cool the air-cooled server modules by cooling the surrounding air in the interior of the server housing via a heat exchanger in the server housing.

After exiting the server housing for cooling the air-cooled server modules, the cooling fluid is, in the method according to the present invention, passed on towards the immersion-cooled server modules. Here, the cooling fluid, e.g. the second cooling fluid, is fed into the immersion-cooled server modules at a second inlet temperature that may be similar to the first exit temperature. Although this second inlet temperature is higher than the first inlet temperature used for cooling the air-cooled server modules, it is still low enough to provide for cooling power of the immersion-cooled server modules, which typically operate at higher temperatures than the air-cooled server modules. After having cooled the immersion-cooled server modules, the cooling fluid, e.g. the second cooling fluid, has an even higher temperature, e.g. the second outlet temperature, as a result the heat absorbed from the immersion-cooled server modules.

In embodiments of the method, the second inlet temperature may be in the range between 30° and 35° C., for example 32° C., and the second outlet temperature may be in the range between 40° and 45° C., for example 42° C.

In the case where the cooling fluid comprises a gaseous coolant, the cooling fluid may pass towards a heat exchanger to withdraw heat from the liquid, for example oil, in which the immersion-cooled server modules are submerged. Where the cooling fluid comprises a liquid coolant, the liquid cooling fluid may be passed directly through the immersion-cooled server modules, i.e. so that the server modules effectively become submerged in the liquid cooling fluid. Alternatively, the liquid cooling fluid may be circulated through a closed ducting system, configured to indirectly cool the immersion-cooled server modules by cooling the immersion liquid, e.g. a non-conductive oil, in the interior of the server module via a heat exchanger.

According to the present invention, the first cooling fluid may be a gaseous coolant, for example air, which may freely pass through the server housing and along the air-cooled server modules in the first cooling circuit. The second cooling fluid may be different from the first cooling fluid, for example being a liquid, such as water, which may circulate through the immersion-cooled server modules in the second cooling circuit. The liquid cooling fluid may be passed directly through the immersion-cooled server modules, i.e. so that the server modules effectively become submerged in the liquid cooling fluid.

The second outlet temperature of the cooling fluid exiting the immersion-cooled server modules may be much higher than the first outlet temperature of the cooling fluid from the air-cooled server modules. This higher temperature results in a higher thermal energy of the cooling fluid and enables more efficient re-usage of the heat that is withdrawn from the server modules. The makes the present method more energy-efficient, and thus more environmentally-friendly, than cooling methods in existing datacentre modules, where residual heat is simply discarded towards the environment.

BRIEF DESCRIPTION OF DRAWINGS

Further characteristics of the invention will be explained below, with reference to embodiments, which are displayed in the appended drawings, in which.

Throughout the figures, the same reference numerals are used to refer to corresponding components or to components that have a corresponding function.

DETAILED DESCRIPTION OF EMBODIMENTS

Figure 1:
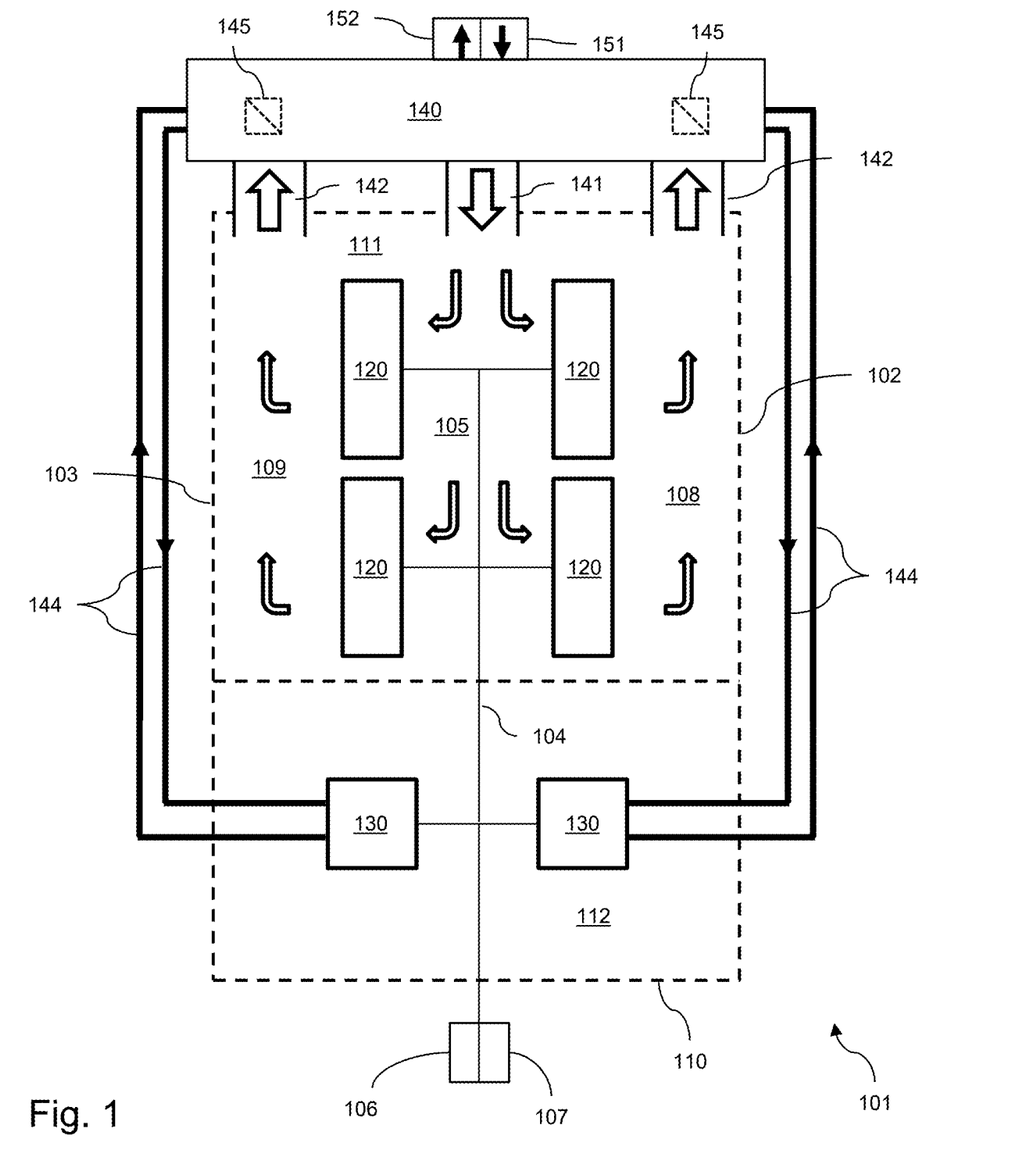
FIG. 1 schematically depicts an embodiment of the hybrid datacentre module according to the present invention, and FIG. 2 schematically depicts another embodiment of the hybrid datacentre module according to the present invention.
Figure 2:
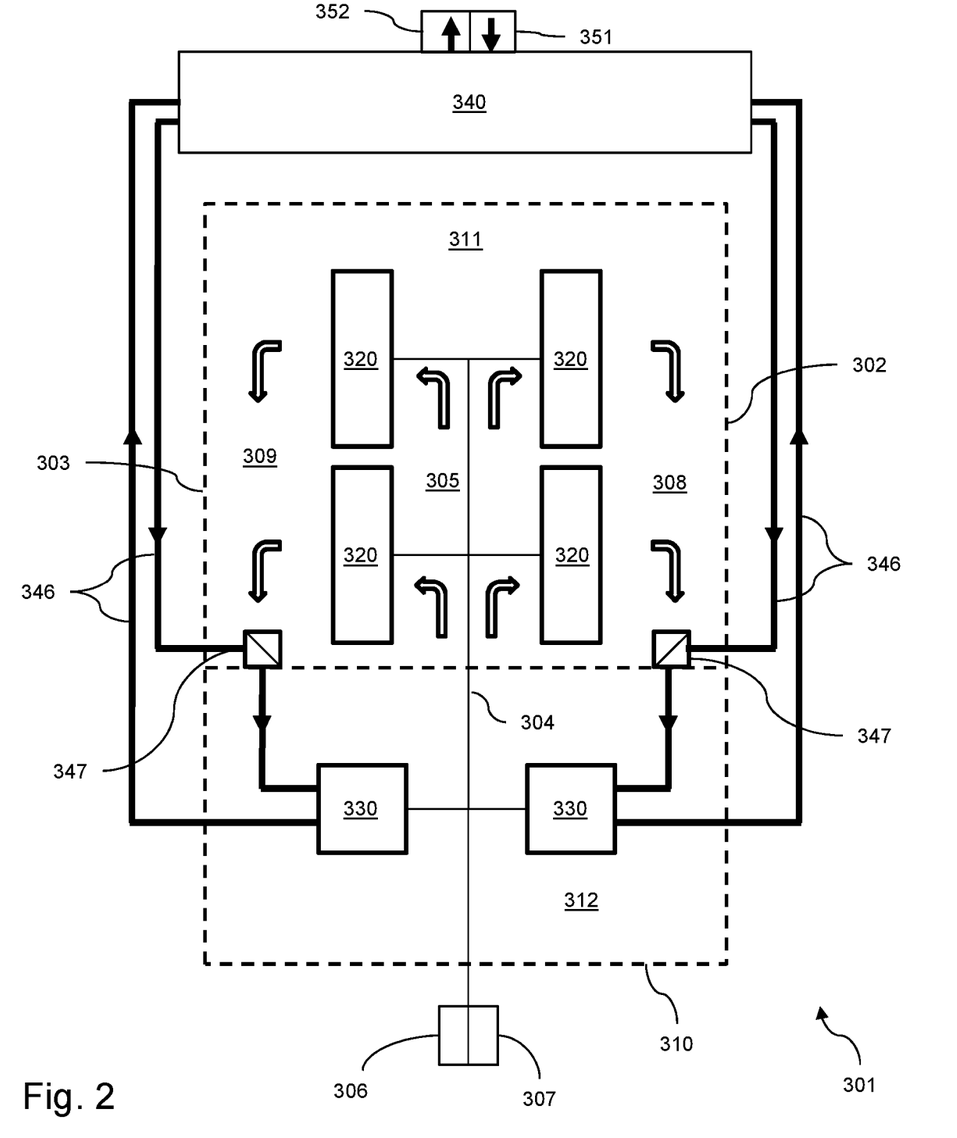

FIG. 1 schematically depicts an embodiment hybrid datacentre module, to which is referred with reference numeral 101. FIG. 2 depicts a second embodiment of the hybrid datacentre 301. Common features in the second embodiment of the hybrid datacentre module 301 have the same numeral as in the first embodiment, with a 3 instead of a 1 as the first digit.

The inventive datacentre module 101 is a hybrid datacentre module, which implies that it operates more than a single type of server modules. The multiple types of server modules are thus integrated in a single module and are wiredly connected to each other to enable data communication between both types of server modules.

The hybrid datacentre module 101 comprises a server housing 110, which is displayed in the figures by means of a dashed line, and a plurality of server modules, which are arranged in an interior of the server housing. The server housing 110 comprises a first side wall 102 and a second side wall 103 and comprises a first compartment 111 and a second compartment 112, which are separated from each other and which extend parallel to each other. With the server housing 110 comprising two compartments 111, 112 that are separated from each other, the conditions may be different in each of the compartments 111, 112, in order to be optimally adjusted for the specific type of server module located in the respective compartment 111, 112. The datacentre module 101 further comprises an entry compartment (not visible in the figures) that is accessible for operators to monitor and control the functioning of the datacentre module 101.

The datacentre module 101 further comprises four air-cooled server modules 120, which are each arranged in a server rack in the interior of the first compartment 111. The air-cooled server modules 120 are positioned in a first row of server racks adjacent the first side wall 102 and a second row of server racks adjacent the second side wall 103. The server racks in the rows of server racks are spaced apart, to define the aisle 105 in between them. The aisle 105 may be accessible for humans, for example to gain access to operators to install or remove server modules, or for carrying out repairs and/or maintenance.

The datacentre module 101 comprises a first spacing 108 between the first side wall 102 and the first row of server racks and a second spacing 109 between the second side wall 103 and the second row of server racks. Fronts of the server racks and the air-cooled server modules 120, facing the aisle 105, are flush with each other to offer a smooth appearance and to make it easier for operators to install or remove server modules 120.

The datacentre module 101 further comprises two immersion-cooled server modules 130, which are also arranged in the interior of the second compartment 112 of the server housing 110. The datacentre module 101 further comprises a wired data transfer connection 104 between the air-cooled server modules 120 and immersion-cooled server modules 130.

The immersion-cooled server modules 130 in the datacentre module 101 may be used for computing purposes and the air-cooled server modules 120 may be used for data storage purposes. Since both types of server modules 120, 130 are integrated in the same server housing 110, the length of the wired data transfer connection 104 is relatively small in the present embodiment, e.g. less than 10 meters. As such, very few losses in data transfer occur between the immersion-cooled server modules 130 and the air-cooled server modules 120, which enables the immersion-cooled server modules 130 to operate at their maximum performances.

The datacentre module 101 further comprises a cooling device 140, which is configured to dissipate heat generated by the server modules 120, 130 out of the server housing 110. The cooling device 140 is associated with both the air-cooled server modules 120 and the immersion-cooled server modules 130. It is shown in FIG. 1 that the cooling device 140 is located in a separate cooling compartment, which is located adjacent the server housing 110.

The cooling device 140 is configured to first cool the air-cooled server modules 120, which requires a relatively low temperature, e.g. a first inlet temperature, and configured to secondly cool the immersion-cooled server modules 130, which requires a relatively high temperature, e.g. a second inlet temperature. Both for the cooling of the air-cooled server modules 120 in the first compartment 111 and the immersion-cooled server modules 130 in the second compartment 112, a flow direction of the respective cooling fluid is indicated by means of arrows.

The cooling device 140 is connected to the server housing 110 and configured to guide a flow of cooling fluid, and is, via an inlet 141 in the ceiling of the first compartment 111 that projects into the aisle 105, configured to pump the cooling fluid into the first compartment 111 at a first inlet temperature t1. The cooling device 140 is further configured to extract the cooling fluid, via two outlets 142 in the spacings between the server racks with the air-cooled server modules 120 and the respective first side wall 102 and second side wall 103, from the first compartment 111 at a first outlet temperature T1, higher than the first inlet temperature t1. The cooling device 140 is thus configured to extract the cooling fluid out of the first compartment 111 from the first spacing 108 and the second spacing 109, to effect a flow of cooling fluid from the aisle 105 through the rows of server racks.

In the embodiment shown in FIG. 1, the cooling fluid is a gaseous coolant, e.g. air, that is circulated through the interior of the first compartment 111 of the server housing 110 to directly cool the air-cooled server modules 120. The first inlet temperature t1 is in the range between 20° and 25° C., e.g. 22° C., and the first outlet temperature T1 is in the range between 30° and 35° C., e.g. 32° C.

The cooling device 140 is further connected to each of the immersion-cooled server modules 130 in the second compartment 112, and is further configured to pump the cooling fluid into the immersion-cooled server modules 130 at a second inlet temperature t2 and configured to extract the cooling fluid from the immersion-cooled server modules 130 at a second outlet temperature T2, higher than the second inlet temperature t2.

After exiting the first compartment 111 for cooling the air-cooled server modules 120, the cooling fluid is thus passed on towards the immersion-cooled server modules 130. Here, the cooling fluid is fed into the immersion-cooled server modules 130 at the second inlet temperature t2 that may be similar to the first exit temperature T1. Although this second inlet temperature t2 is higher than the first inlet temperature t1 used for cooling the air-cooled server modules 120, it is still low enough to provide for cooling power of the immersion-cooled server modules 130, which typically operate at higher temperatures than the air-cooled server modules 120.

In the embodiment of FIG. 1, the a liquid coolant is fed towards the immersion-cooled server modules 130 from the cooling device 140. Inside the immersion-cooled server modules 130, the liquid cooling fluid is circulated through a closed ducting system, configured to indirectly cool the immersion-cooled server modules 130 by cooling the immersion liquid, e.g. electrically non-conductive oil, in the interior of the server module 130 via a heat exchanger.

After having cooled the immersion-cooled server modules 130, the cooling fluid has an even higher temperature, e.g. the second outlet temperature T2, as a result the heat absorbed from the immersion-cooled server modules 130. The second inlet temperature t2 is in the range between 30° and 35° C., e.g. 32° C., and the second outlet temperature T2 is in the range between 40° and 45° C., e.g. 42° C.

The second outlet temperature T2 of the cooling fluid exiting the immersion-cooled server modules 130 is much higher than the first outlet temperature T1 of the cooling fluid from the air-cooled server modules 120. This higher temperature results in a higher thermal energy of the cooling fluid and enables more efficient re-usage of the heat that is withdrawn from the server modules 120, 130.

In the embodiment of the datacentre module 101 shown in FIG. 1, the cooling device 140 comprises a first cooling circuit, which comprises the inlet 141 and the outlet 142 and which is connected to the first compartment 111 of the server housing 110. The first cooling circuit is configured to guide a flow of the first, e.g. gaseous, cooling fluid. The cooling device 140 is thereby configured to pump the first cooling fluid into the first compartment 111 of the server housing 110 at the first inlet temperature t1 and configured to extract the first cooling fluid from the first compartment 111 of the server housing 110 at the first outlet temperature T1.

In the embodiment of FIG. 1, the cooling device 140 further comprises a second cooling circuit 144, which is connected to the immersion-cooled server modules 130 and configured to guide the flow of second cooling fluid, e.g. of liquid coolant. The cooling device 140 is further configured to pump the second cooling fluid into the immersion-cooled server modules 130 at the second inlet temperature t2 and configured to extract the second cooling fluid from the immersion-cooled server modules 130 at the second outlet temperature T2.

The cooling device also comprises two first heat exchangers 145, which are fluidly connected to the first cooling circuit and the second cooling circuit 144. The first heat exchangers 145 are configured to transfer heat from the first cooling fluid in the first cooling circuit, that is to be extracted from the first compartment 111 of the server housing 110, to the second cooling fluid in the second cooling circuit 144, that is to be pumped into the immersion-cooled server modules 130.

The datacentre module 101 further comprises a heating fluid inlet 151 and a heating fluid outlet 152, which are fluidly connected to the cooling device 140 and fluidly connectable to an external heating network, to respectively allow entry of a heating fluid from the heating network into the cooling device 140 and exit of the heating fluid from the cooling device 140 into the heating network.

Via the heating fluid inlet 151, a heating fluid from an external heating network, e.g. cold water from a district heating network, enters the datacentre module 101 and is fed into the cooling device 140. By means of the cooling device 140, the heat obtained from the server modules 120, 130 is transferred into the heating fluid. Accordingly, the server modules 120, 130 are cooled and the heating fluid, e.g. the water from the district heating network, is heated. After being heated, the heating fluid is transported out of the datacentre module 101 via the heating fluid outlet 152, in order to be fed back towards the external heating network.

The datacentre module 101 further comprises a heating fluid circuit and a third heat exchanger (not shown in the figures). The heating fluid circuit is fluidly connected to the heating fluid inlet 151 and to the heating fluid outlet 152 to allow a flow of the heating fluid therethrough between the heating fluid inlet 151 and the heating fluid outlet 152. The third heat exchanger is fluidly connected to the cooling device 140 and the heating fluid circuit and configured to transfer heat from the cooling device 140, which heat has been extracted from the server housing 110, to the heating fluid that is to be passed through the heating fluid circuit.

The heating fluid from the external heating network, e.g. the cold water from the district heating network, is guided into the heating fluid circuit of the datacentre module 101. The heating fluid is guided towards the third heat exchanger, where the heat obtained from the server modules 120, 130 is transferred indirectly towards the heating fluid. Accordingly, the heating fluid does not need to be in contact with the server modules 120, 130. Instead, the cooling fluid circuit 144 of the datacentre module 1 is a closed-off system, in order to reduce possible risks of failure. After being heated, the heating fluid leaves the third heat exchanger and flows out of the datacentre module 101 via the heating fluid outlet 152, back into the external heating network.

The datacentre module 101 comprises a power inlet 106, which is electrically connectable to an external electrical power supply for supplying electrical power to the datacentre module 101. All electric components, such as the server modules 120, 130 and the cooling device 140, are connected to the power inlet 106, so that only a single connection between the datacentre module 101 and the external electrical power supply, e.g. via the power inlet 106, needs to be made to provide electrical power to the hybrid datacentre module 101 in a plug-and-play manner.

The datacentre module 101 further comprises a data interface 107, which is wiredly connected for data transfer to the server modules 120, 130 and wiredly connectable to an external network, e.g. to server modules of an existing datacentre, for data transfer between the server modules 120, 130 and the external network.

Similar to the power inlet 106, the data interface 107 provides for a single data connection between all components, e.g. all server modules 120, 130 and the external network, to improve the convenience of the datacentre module 101.

The embodiment of the datacentre module 301 in FIG. 2 differs from the embodiment in FIG. 1 in that it lacks a gaseous cooling fluid being provided by the cooling device 340. Instead, the cooling fluid comprises a liquid coolant, e.g. water, that is circulated through a closed ducting system 346, configured to indirectly cool the air-cooled server modules 320 by cooling the surrounding air in the first compartment 311 of the server housing 310 via two second heat exchangers 347 in the first compartment 311 of the server housing 310.

The second heat exchangers 347 are embodied as radiators, that are located in the server housing 110, each comprising a fluid passage that is fluidly connected to the cooling device 340 by means of the ducting system 346 and a heat exchanger surface that is integrally connected to the fluid passage. The second heat exchangers 347 are configured to withdraw heat from the air in the first compartment 311 of the server housing 310 upon contact with the heat exchanger surface.

The surrounding air inside the first compartment 311 of the server housing 310 heated by the air-cooled server modules 320 during use, e.g. being circulated alongside the air-cooled server modules 320 to absorb heat from the server modules by convection. The air is further circulated along the heat exchanger surface of the second heat exchangers 347 that is in contact with the cooling fluid.

The cooling device 340 is configured to pump the cooling fluid, e.g. water, into the fluid passage to pass through the second heat exchangers 347. The cooling fluid entering the second heat exchangers 347 at the first inlet temperature $t1$ has a lower temperature than the temperature of the surrounding air in the first compartment 311 of the server housing 310, so that heat can be transferred from the air, via the heat exchanger surface, towards the cooling fluid. Accordingly, the cooling fluid is heated by the air and exits the second heat exchangers 347, e.g. also exiting the first compartment 311, at the first outlet temperature $T1$, which is higher than the first inlet temperature $t1$.

After exiting the second heat exchangers 347, the liquid coolant is fed towards the immersion-cooled server modules 330 for cooling the immersion-cooled server modules 330 in a similar manner as described for the embodiment in FIG. 1.

The invention claimed is:

1. A hybrid datacentre module, comprising:
   a server housing comprising a first side wall and a second side wall;
   one or more server modules arranged in an interior of the server housing; and
   a cooling device configured to dissipate heat generated by the server modules out of the server housing,
   wherein the server housing comprises one or more server racks,
   wherein the one or more server modules comprise one or more air-cooled server modules arranged in the one or more server racks,
   wherein the server racks are arranged in the server housing in a first row of the server racks adjacent the first side wall and a second row of the server racks adjacent the second side wall,
   wherein an aisle is in between the first row of server racks and the second row of server racks,
   wherein the cooling device comprises a first cooling circuit, which is connected to the server housing and configured to guide a flow of first cooling fluid,
   wherein the cooling device is configured to pump the first cooling fluid into the server housing at a first inlet temperature and configured to extract the first cooling fluid from the server housing at a first outlet temperature, higher than the first inlet temperature,
   wherein an upstream part the cooling device projects in the aisle, being configured to pump the first cooling fluid into the server housing in the aisle,
   wherein, the one or more server modules further comprise one or more immersion-cooled server modules,
   wherein the datacentre module further comprises a wired data transfer connection between the air-cooled server modules and the immersion-cooled server modules,
   wherein the cooling device is further connected to the immersion-cooled server modules,
   wherein the cooling device further comprises a second cooling circuit, which is connected to the immersion-cooled server modules and configured to guide a flow of second cooling fluid,
   wherein the cooling device is further configured to pump the second cooling fluid with heat from the server housing into the immersion-cooled server modules at a second inlet temperature and configured to extract the second cooling fluid from the immersion-cooled server modules at a second outlet temperature, higher than the second inlet temperature,
wherein the cooling device also comprises a first heat exchanger, which is fluidly connected to the first cooling circuit and the second cooling circuit, and
wherein the first heat exchanger is configured to transfer heat from the first cooling fluid in the first cooling circuit, that is to be extracted from the server housing, to the second cooling fluid in the second cooling circuit, that is to be pumped into the immersion-cooled server modules.

2. The hybrid datacentre module according to claim 1, wherein the server housing comprises a first compartment and a second compartment, which are separated from each other,
wherein the one or more server racks, with the one or more air-cooled server modules arranged therein, are arranged in the first compartment,
wherein the one or more immersion-cooled server modules are arranged in the second compartment, and
wherein the cooling device is configured to pump the first cooling fluid into the first compartment and to pump the second cooling fluid into the immersion-cooled server modules in the second compartment.

3. The hybrid datacentre module according to claim 2, wherein the first cooling circuit is connected to the interior of the first compartment and wherein the second cooling circuit is connected to the immersion-cooled server modules in the second compartment.

4. The hybrid datacentre module according to claim 1, comprising a heating fluid inlet and a heating fluid outlet, which are fluidly connected to the cooling device and fluidly connectable to an external heating network, to respectively allow entry of a heating fluid from the heating network into the cooling device and exit of the heating fluid from the cooling device into the heating network.

5. The hybrid datacentre module according to claim 4, further comprising a heating fluid circuit and a third heat exchanger,
wherein the heating fluid circuit is fluidly connected to the heating fluid inlet and to the heating fluid outlet to allow a flow of the heating fluid therethrough between the heating fluid inlet and the heating fluid outlet,
wherein the third heat exchanger is fluidly connected to the cooling device and the heating fluid circuit, and
wherein the third heat exchanger is configured to transfer heat from the cooling device, which heat has been extracted from the server housing, to the heating fluid that is to be passed through the heating fluid circuit.

6. The hybrid datacentre module according to claim 5, wherein the cooling device is fluidly connected to the heating fluid inlet and to the heating fluid outlet to allow a flow of the heating fluid through the cooling device.

7. The hybrid datacentre module according to claim 1, comprising a power inlet, which is electrically connectable to an external electrical power supply for supplying electrical power to the datacentre module.

8. The hybrid datacentre module according to claim 1, comprising a data interface, which is wiredly connected for data transfer to the server modules and wiredly connectable to an external network for data transfer between the server modules and the external network.

9. The hybrid datacentre module according to claim 2, comprising a first spacing between the first side wall and the first row of server racks and a second spacing between the second side wall and the second row of server racks,
wherein a downstream part of the cooling device projects into the first spacing and into the second spacing, such that the cooling device is configured to extract the cooling fluid out of the first compartment from the first spacing and the second spacing, to effect a flow of cooling fluid from the aisle through the first row of server racks and through the second row of server racks.

10. The hybrid datacentre module according to claim 2, further comprising an entry compartment, which is located in between the first compartment and the second compartment, being separated therefrom by partition walls,
wherein the entry compartment comprises an entry door providing access into the entry compartment from outside the datacentre module, and
wherein the partition walls comprise access doors to allow access from the entry compartment into the first compartment and into the second compartment.

11. The hybrid datacentre module according to claim 1, further comprising a separate cooling compartment, which is located adjacent the server housing, and
wherein the cooling device is at least partly arranged in the cooling compartment.

12. A method of retrofitting an existing datacentre having air-cooled server modules with immersion-cooled server modules, comprising the steps of:
providing the hybrid datacentre module according to claim 1;
arranging the hybrid datacentre module inside the existing datacentre; and
wiredly connecting the one or more server modules of the hybrid datacentre module to the air-cooled server modules of the existing datacentre.

13. A method comprising using the hybrid datacentre module according to claim 1 for computing and/or storing data.

14. A method of cooling the hybrid datacentre module according to claim 1, comprising the steps of:
pumping a first cooling fluid in a first cooling circuit into a server housing, which comprises one or more server racks having one or more air-cooled server modules arranged therein, at a first inlet temperature; and
extracting the first cooling fluid from the server housing at a first outlet temperature, higher than the first inlet temperature,
wherein the one or more server modules further comprise one or more immersion-cooled server modules, and
wherein the method further comprises the steps of:
transferring heat from the first cooling fluid in the first cooling circuit to the second cooling fluid in the second cooling circuit by a first heat exchanger;
pumping a second cooling fluid in a second cooling circuit into one or more immersion-cooled server modules at a second inlet temperature; and
extracting the second cooling fluid from the immersion-cooled server modules at a second outlet temperature, higher than the second inlet temperature.

15. The hybrid datacentre module according to claim 2, wherein the first cooling circuit is connected to the interior of the first compartment and wherein the second cooling circuit is connected to the immersion-cooled server modules in the second compartment.

16. The hybrid datacentre module according to claim 2, comprising a heating fluid inlet and a heating fluid outlet, which are fluidly connected to the cooling device and fluidly connectable to an external heating network, to respectively allow entry of a heating fluid from the heating network into the cooling device and exit of the heating fluid from the cooling device into the heating network.

17. The hybrid datacentre module according to claim 3, comprising a heating fluid inlet and a heating fluid outlet, which are fluidly connected to the cooling device and fluidly connectable to an external heating network, to respectively allow entry of a heating fluid from the heating network into the cooling device and exit of the heating fluid from the cooling device into the heating network.

18. The hybrid datacentre module according to claim 2, comprising a power inlet, which is electrically connectable to an external electrical power supply for supplying electrical power to the datacentre module.

19. The hybrid datacentre module according to claim 3, comprising a power inlet, which is electrically connectable to an external electrical power supply for supplying electrical power to the datacentre module.

\* \* \* \* \*